United States Patent [19]

Parra

[11] Patent Number: 6,147,929
[45] Date of Patent: Nov. 14, 2000

[54] METHOD FOR PREDICTING CONTINUOUS AND DISCONTINUOUS WAVEGUIDE TARGETS USING INTERWELL SEISMIC SIGNATURE CHARACTERISTICS

[75] Inventor: Jorge Octavio Parra, Helotes, Tex.

[73] Assignee: Gas Research Institute, Chicago, Ill.

[21] Appl. No.: 09/034,530

[22] Filed: Mar. 3, 1998

[51] Int. Cl.$^7$ ..................................................... G01V 1/00
[52] U.S. Cl. .............................. 367/69; 367/57; 181/106
[58] Field of Search .................................. 367/25, 30, 31, 367/57, 49, 38, 69, 86, 33, 75; 181/100, 106

[56] References Cited

U.S. PATENT DOCUMENTS

| | | |
|---|---|---|
| H1307 | 5/1994 | Krohn . |
| 4,751,688 | 6/1988 | Paulsson . |
| 4,783,688 | 11/1988 | Shannon . |
| 4,783,771 | 11/1988 | Paulsson . |
| 4,817,062 | 3/1989 | De Buyl et al. . |
| 5,005,159 | 4/1991 | Krohn . |
| 5,130,949 | 7/1992 | Kan et al. . |
| 5,144,590 | 9/1992 | Chon ......................................... 367/57 |
| 5,197,038 | 3/1993 | Chang et al. .............................. 367/28 |
| 5,200,928 | 4/1993 | MaCleod . |
| 5,233,568 | 8/1993 | Kan et al. . |
| 5,253,217 | 10/1993 | Justice, Jr. et al. . |
| 5,260,911 | 11/1993 | Mason et al. ............................. 367/57 |
| 5,481,501 | 1/1996 | Blakeslee et al. . |
| 5,648,937 | 7/1997 | Campbell . |

OTHER PUBLICATIONS

M. Lou et al.: Guided–wave propagation between boreholes, 34–37, *Geophysics: The Leading Edge of Exploration*, Jul. 1992.

Cohen, L.: Time–Frequency Distribution—A Review, IEEE Proceedings, vol. 77, pp. 941–981, 1989.

Turpening, W.R. et al: Detection of Reservoir Continuity Using Crosswell Seismic Data—A Gypsy Pilot Study, S.P.E. 24711, pp. 503–511, 1992.

Doyle, J.D. et al.: Three–Dimensional Distribution of Lithofacies, Bounding Surfaces, Porosity and Permeability in a Fluvial Sandstone, Gypsy Sandstone of Northern Oklahoma, American Association of Petroleum Geologist Bulletin, vol. 79, pp. 70–76, 1995.

Parra, J.O. et al.: Interwell Seismic Logging For Formation Continuity at the Gypsy Test Site, Oklahoma, Journal of Applied Geophysics, vol. 35, pp. 45–62, 1996.

*Primary Examiner*—Christine K. Oda
*Assistant Examiner*—Anthony Jolly
*Attorney, Agent, or Firm*—Pauley Petersen Kinne & Fejer

[57] ABSTRACT

A method for planning continuity logging surveys and for detecting the presence of a continuous or discontinuous low-velocity inclusion in a subterranean geological formation. To detect the presence of a continuous or discontinuous low-velocity inclusion, a seismic source is inserted into a source borehole located at either a boundary or a center of a low velocity inclusion. Seismic energy is generated coupled to the low-velocity inclusion using the seismic source. The seismic energy propagates as seismic waves through the low-velocity inclusion and is measured and recorded by at least one detector disposed in a receiver borehole. The seismic waves are analyzed for the presence of at least one seismic signature from which the distance of a discontinuity, if any, of the low-velocity inclusion with respect to the receiver borehole can be determined.

5 Claims, 15 Drawing Sheets

METHOD FOR PREDICTING CONTINUOUS AND DISCONTINUOUS WAVEGUIDE TARGETS USING INTERWELL SEISMIC SIGNATURE CHARACTERISTICS

BACKGROUND OF THE INVENTION

1. Field of the Invention

This invention relates to a method applied to reservoir geophysics for delineation of the reservoir architecture of oil or gas fields and for mapping the continuity of producing horizons as well as correlating lithology and stratigraphy between wells. The architecture of a reservoir generally includes structures of flow units, ceiling surfaces and boundary surfaces that result from deposition and digenesis. In particular, this invention provides a method for detecting the presence of continuous and discontinuous low-velocity inclusions in subterranean geological formations by analyzing seismic signatures recorded between two or more wells or boreholes, and determining the distance of a discontinuity with respect to the position of a receiver borehole.

2. Description of Prior Art

It has long been desirable to analyze and evaluate structure and stratigraphy of petroleum producing formations. One purpose, for example, has been in conjunction with secondary and tertiary recovery operations. In recent years, there has been increased interest in seismic methods for reservoir definition and description. One method has been the crosswell seismic method in which seismic energy emitted from sources in one well or borehole is sensed and recorded as seismic data by arrays of detectors in one or more other wells. The recorded seismic data is then processed to form tomographic images of interwell geologic features based on the crosswell seismic data. Techniques using crosswell seismic data are based on tomographic reconstruction for interwell seismic velocity imaging. Although tomographic imaging between boreholes can produce very good images, certain conditions must be present. Unfortunately, in most petroleum reservoirs, these conditions are quite difficult to achieve. U.S. Pat. No. 5,144,590 teaches a method for determining the continuity of subsurface formations between well boreholes in which seismic energy is sent from a seismic source in one of the wells at various selected fixed depths and detected by a number of sensing geophones deployed at selected fixed depths in one or more adjacent wells. A frequency domain decomposition process is then performed on the data in order to determine if any of the formations located between the wells function as waveguides for seismic energy within the frequencies of interest. Those formations exhibiting waveguide properties are indicated as continuous between the wells.

U.S. Pat. No. 5,005,159 teaches a method of determining the continuity of a lithographic layer located between two vertical boreholes in which a seismic source is lowered into the first borehole while simultaneously a receiver pair, preferably a pair of "vertical" geophones spaced apart by about two feet, are lowered into a second borehole to develop a "difference signal". The recording of high amplitude signals within a layer is an indication of a continuous, low velocity layer. The middle of a layer can also be discovered using a single vertical receiver and finding the place of phase reversal. See also U.S. Pat. No. 4,783,771, U.S. Pat. No. 4,751,688, U.S. Pat. No. 5,197,038, U.S. Pat. No. 5,253,217, U.S. Pat. No. 5,260.911, and U.S. Pat. No. 5,200,928, all of which relate to methods of seismic surveying for defining subterranean formations. See also U.S. Pat. No. 5,481,501 which teaches a method for simulating crosswell seismic data between first and second spaced apart wells and U.S. Pat. No. 5,648,937 which teaches a method and apparatus for adjusting the results of a seismic survey according to well log data obtained from wells within a survey region.

State of the art crosswell technology does not currently address the presence of different trapped modes and body waves associated with the petrophysics of an inclusion and host rock. In addition, the current methodology does not utilize the response characteristics of individual seismic events observed in full waveform signatures as recorded at receiver boreholes to determine if a low-velocity inclusion is continuous or discontinuous. Accordingly, a method is needed for planning continuity logging surveys using lithological information, for example, compressional and shear wave velocity logs, and density logs, as input parameters to predict full waveform seismic signatures at different well separations and inclusion thicknesses. A method is also needed which enables prediction of continuous and discontinuous inclusions through analysis of the different seismic responses or (vents recorded between wells.

SUMMARY OF THE INVENTION

Accordingly, it is one object of this invention to provide a method for determining the continuity or discontinuity of a subterranean low-velocity inclusion. It is another object of this invention to provide a methodology for planning continuity logging surveys using lithological information as input parameters to predict full waveform seismic signatures at different well separations and inclusion thicknesses.

It is yet another object of this invention to provide a method which can be used to interpret continuity logging data.

It is yet another object of this invention to provide a method for determining interwell continuity of reservoir formation.

It is another object of this invention to provide a method for establishing accurate geological bed ties between widely spaced wells.

It is still another object of this invention to provide a method for estimating average rock physical properties in continuous reservoir layers.

These and other objects of this invention are achieved by a method for detecting a presence of a continuous or discontinuous waveguide in a subterranean geological formation in which at least one seismic signal characteristic of a waveguide target corresponding to a seismic wave receiver borehole is determined. A seismic wave signal is then generated in a source borehole disposed at a distance from the receiver borehole. The seismic wave signal is detected at the receiver borehole and analyzed for a presence of said at least one seismic signal characteristic. The presence of said at least one seismic signal characteristic is indicative of a continuous waveguide disposed between the source borehole and the receiver borehole.

The interwell logging method of this invention utilizes the different events characteristic observed in the full waveform seismic signatures for predicting if a low-velocity inclusion, or waveguide, is continuous between wells. Such events can be body waves (direct waves and head waves), interface waves, reflections, leaky modes and normal modes (pseudo-Rayleigh-waves and pseudo-Love-waves). A single event or a combination of these events can constitute a seismic signature that can be used to identify the presence of the inclusion geometry and its physical properties. The analysis of a signature characteristic can predict if the inclusion is continuous or discontinuous between wells.

BRIEF DESCRIPTION OF THE DRAWINGS

These and other objects and features of this invention will be better understood from the following detailed description taken in conjunction with the drawings wherein.

DETAILED DESCRIPTION OF PREFERRED EMBODIMENTS

This invention is a method for predicting continuous and discontinuous waveguide targets using interwell seismic signature characteristics. The method of this invention is applied to reservoir geophysics to delineate the reservoir architecture of oil or gas fields and to map the continuity of producing horizons as well as to correlate lithology and stratigraphy between wells. Specifically, the invention provides a means for detecting the presence of continuous and discontinuous low-velocity inclusions, or waveguides, in subterranean geological formations by analyzing seismic signatures recorded between wells and determining the distance of a discontinuity with respect to the position of the receiver borehole.

The method of this invention comprises the steps of determining an appropriate seismic source and an appropriate seismic wave detector suitable for conducting a continuity logging survey based upon well log information and well lithological information for a waveguide target well and determining a seismic characteristic, or seismic signature, for a waveguide of the waveguide target well. This includes well log information comprising low-velocity zones from P-wave and S-wave velocity logs, the thickness of each layer of a geological formation around the waveguide target well, and preferably calculation of at least one dispersion curve and at least one attenuation curve for the waveguide target well. Thereafter, the appropriate seismic source is inserted into a source well or borehole located at a distance from the waveguide target well or receiver borehole and seismic waves are generated using the seismic source. Seismic waves propagated through the subterranean geological formation disposed between the source well and the waveguide target well are detected using at least one seismic detector disposed into the waveguide target well. The seismic waves are then analyzed for the presence of the previously determined seismic characteristic. The presence of at least one seismic characteristic at the waveguide target well is indicative of the presence of a continuous waveguide between the source well and the waveguide target well.

Figure 1:
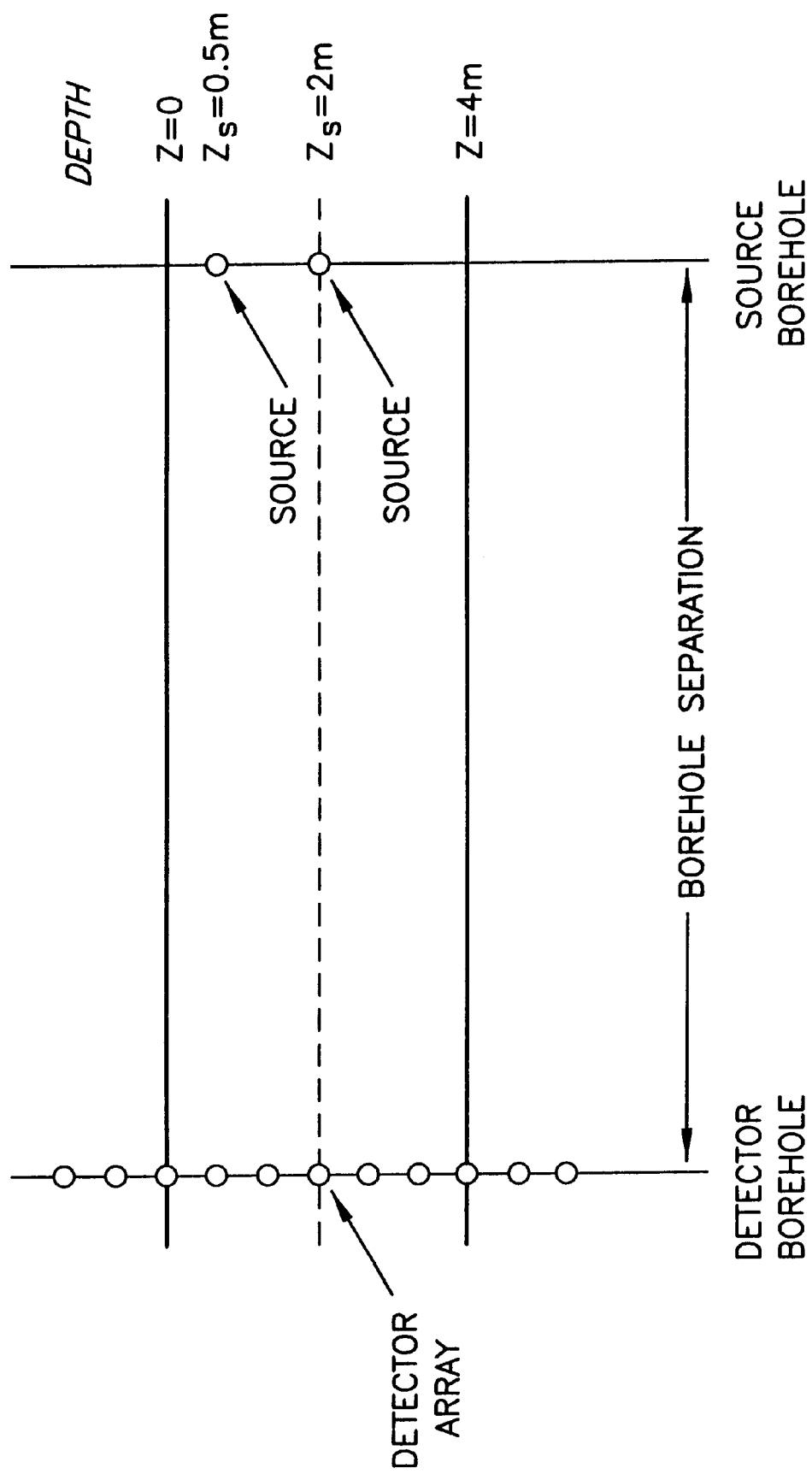
FIG. 1 is a schematic diagram showing a waveguide geometry for the computation of dispersion and attenuation curves as well as synthetic seismograms.

FIG. 1 shows a typical source and detector array configuration suitable for use in accordance with the method of this invention. In accordance with one preferred embodiment of this invention, the seismic waves are recorded by a hydrophone array or a three-component detector array.

In accordance with one preferred embodiment of this invention, the source borehole and the receiver borehole intercept the waveguide or low-velocity inclusion and the seismic source generates P-waves and S-waves. When the source and the receiver borehole intercept the inclusion and the source generates P-waves and S-waves, continuity of the inclusion can be determined by analyzing seismic traces containing head waves, direct waves and leaky modes for waveguides having P-wave velocities greater than the S-wave velocity of the host medium and very low shear wave velocity contrast between the waveguide and the host medium. The resulting signature formed by these seismic events may then be compared to known or experimentally determined formation signatures. For example, the resulting signature formed by these seismic events may correspond to a sandstone waveguide surrounded by shale host medium. For the same source in the presence of a waveguide having a P-wave velocity less than the S-wave of the host medium and a very low P-wave velocity contrast between the waveguide and the host medium, the seismic traces contain head waves, direct waves, and normal modes. This signature may correspond to a shale waveguide surrounded by a sandstone host medium. These concepts are graphically illustrated in the examples given in FIGS. 2(a)–2(f) and FIGS. 5(a)–5(d). The seismic responses shown in these figures were produced using the waveguide model shown in FIG. 1 for the P-wave and S-wave velocity ratios between the waveguide and the host medium, $c_p$, and $c_s$, respectively, given in the seismograms of FIGS. 2(a)–2(f) and FIGS. 5(a)–5(d).

Figure 2A:
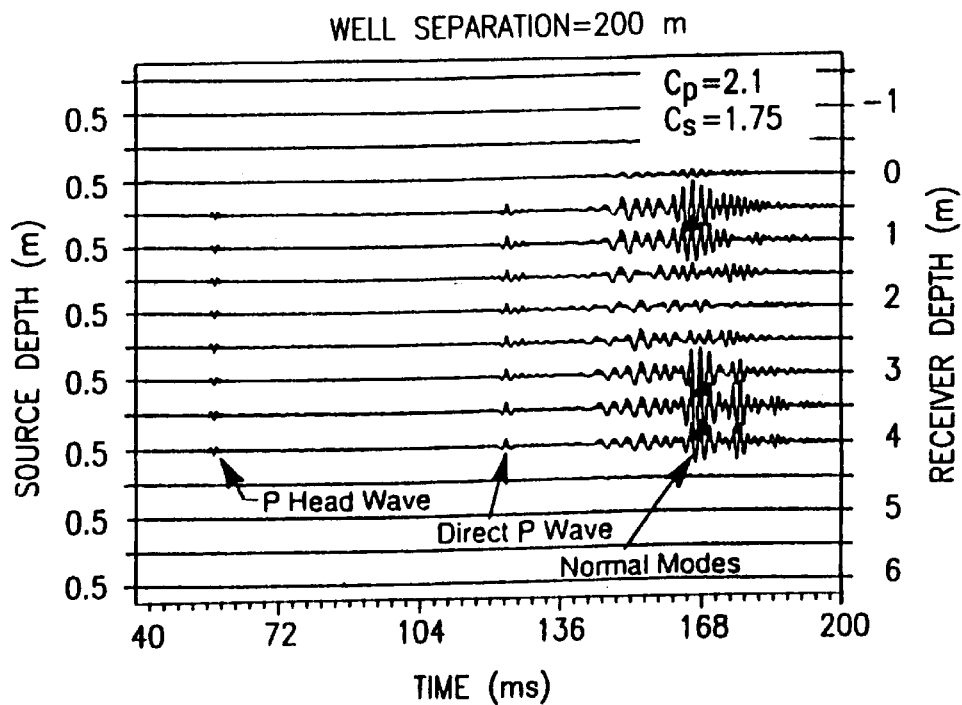
FIGS. 2(a)–2(f) are pressure synthetic seismograms for sandstone waveguides illustrating the effect of velocity contrast and well separation.
Figure 2B:
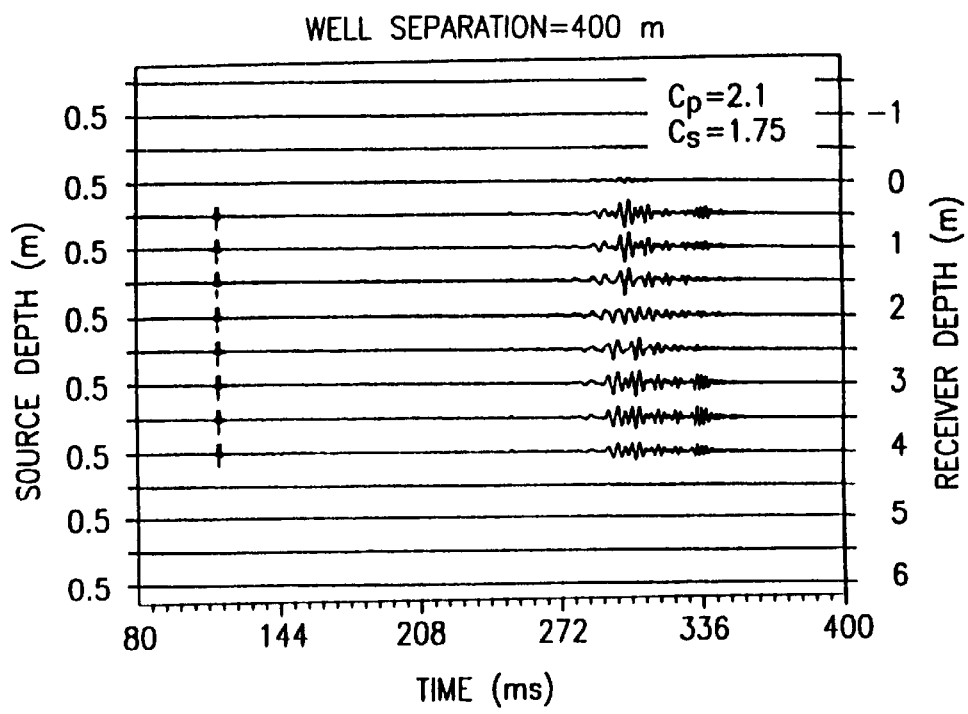
Figure 2C:
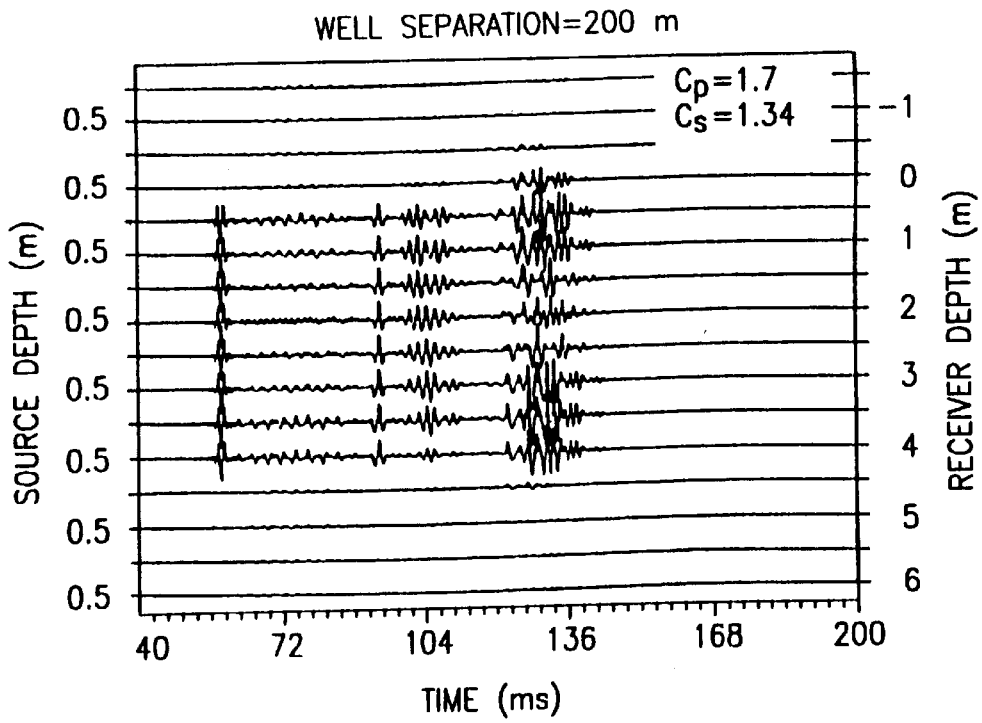
Figure 2D:
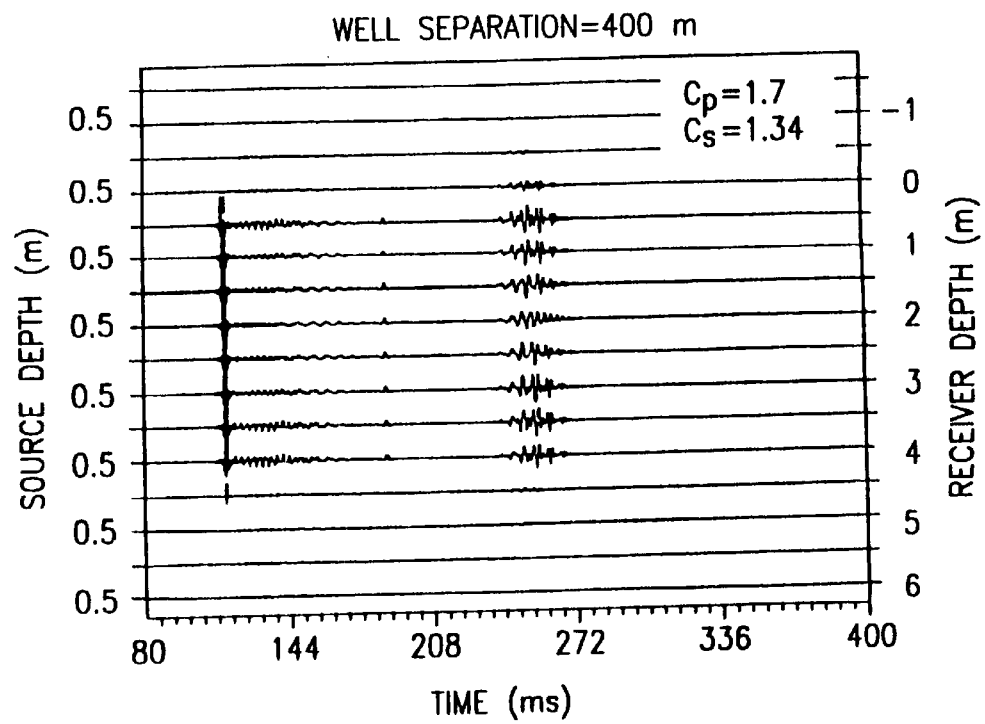
Figure 2E:
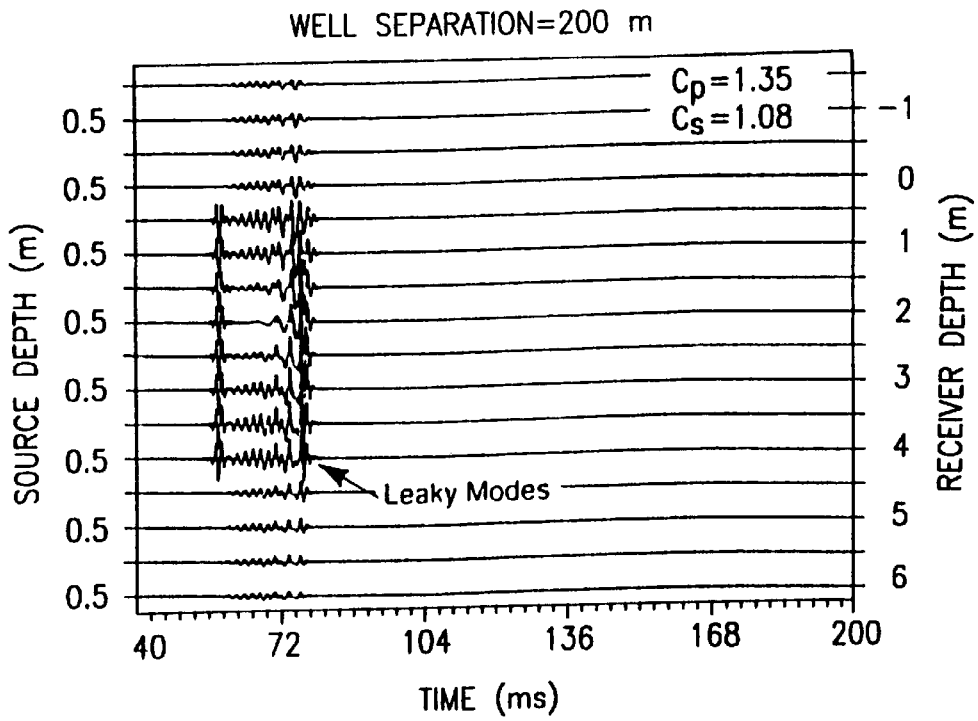
Figure 2F:
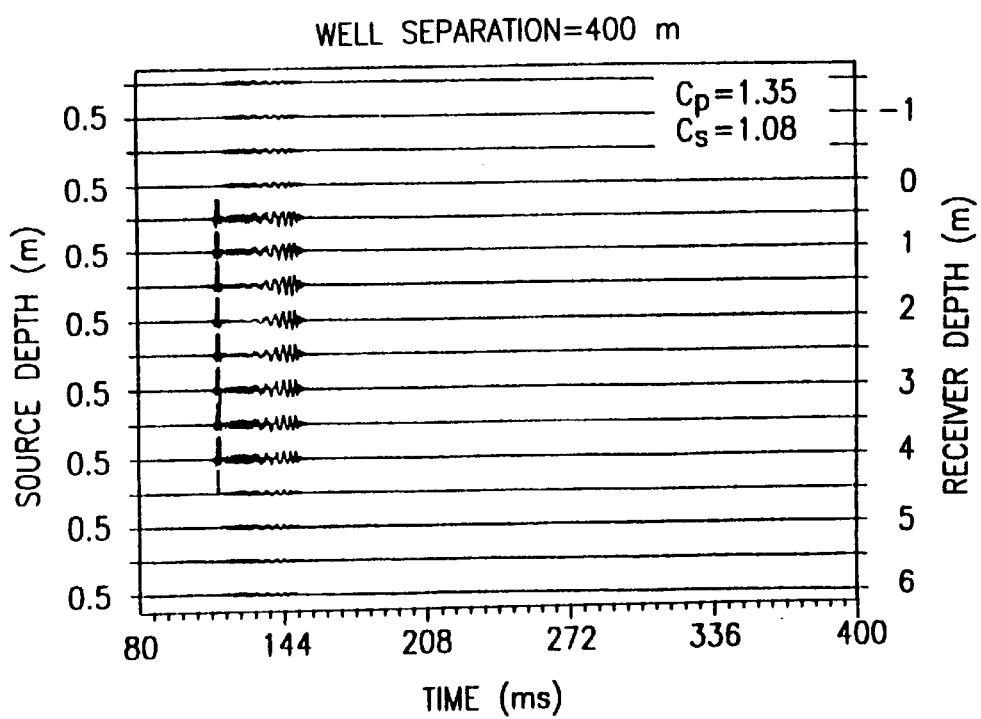

To better demonstrate the concept of this invention in the context of a sandstone waveguide surrounded by shale host medium, the velocity ratio between the waveguide target and the host medium is varied. In FIG. 2(a), the pressure seismogram shows direct P-wave events which propagate in a waveguide with a P-wave velocity of 1627 m/s (meters/second). The direct P-wave events arrive at the detector after 123 ms and they are followed by reflection events. The full waveforms are dominated by modal wavetrains arriving at 139 ms (milliseconds), which travel with a group velocity of about 168 ms with a velocity of 1190 m/s. These wavetrains are normal modes trapped in the sandstone waveguide. In FIG. 2(b), the seismogram shows that when the P-wave and S-wave velocity ratios between the waveguide and the host medium are decreased to $c_p=1.7$ and $c_s=1.34$, respectively, that is the direct P-wave events arrive at 94 ms in a waveguide having a P-wave velocity of 2127 m/s, wavetrains are observed after the direct P-wave event. The full waveforms are dominated by normal modes and some leaky modes, that is trailing energy that appears behind the head waves and direct P-waves, which exhibit different signature characteristics from those signals observed for greater velocity contrasts. In addition, the seismograms shown in FIGS. 2(c) and 2(f) show that as the S-wave velocity ratio ($c_s$) approaches 1, normal modes are not observed any more in the full waveform. That is, the limiting low shear-wave velocity contrast between the sandstone and the shale illustrates that leaky modes can be observed in a sandstone waveguide when normal modes are physically impossible. In this case, the seismic traces are dominated by head waves and leaky modes arriving between the head waves and the direct P-wave events, and the direct P-wave events decay rapidly in the waveguide associated with small S-wave velocity contrasts. In the waveguide, leaky modes represent a constructive interference that acts very much like normal modes, and the P-wave energy plays the major role in the constructive interference. Due to the constant regeneration of the leaky modes behind the leading waveform, the leaky modes together with head waves can be used to predict the presence of a waveguide in crosswell data recorded at large well separations. In this example, P-head waves and leaky modes form a signature characteristic which represents a sandstone waveguide surrounded by a shale host medium.

Figure 3:
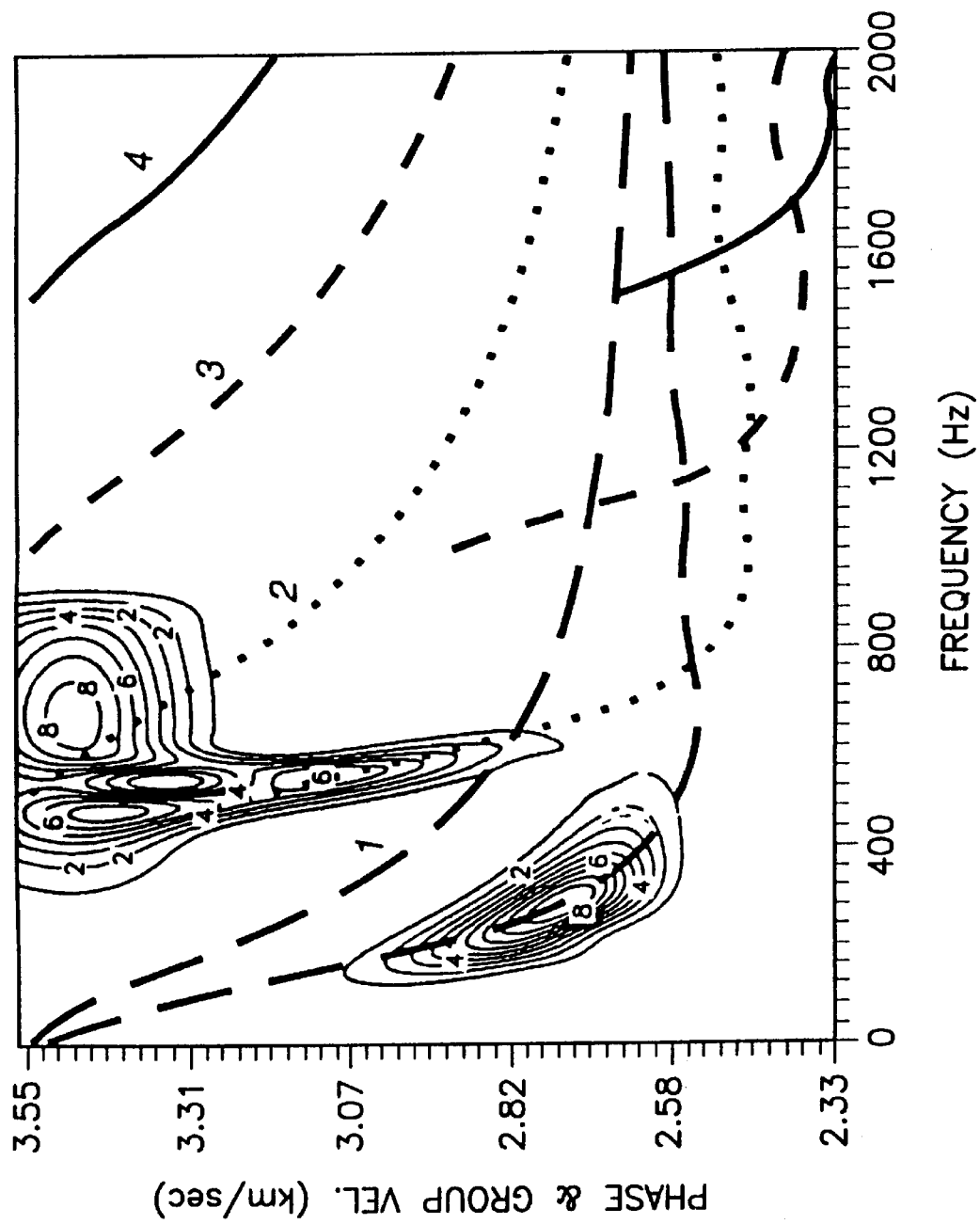
FIG. 3 is a diagram showing a P-head wave group velocity contour in the range of 3550–3360 m/s.

The wavetrains that follow the P-head wave are travelling at velocities between that of the surrounding shale and that of the sand waveguide. These waves are observed at well separations of 200 and 400 m in FIGS. 2(c) and 2(f), respectively, behind the leading wave front of the head wave. To demonstrate that these wavetrains are leaky modes, we calculated group velocity contour plots using time-frequency representation algorithms. (See Cohen, L., "Time-Frequency Distribution—A Review", IEEE Proceedings, 77, 941–981, 1989.) FIG. 3 shows phase velocity and group velocity curves for leaky modes in a low-velocity layer having P-wave and S-wave velocity ratios of 1.35 and 1.08, respectively. Group velocity contours of leaky modes and P-head waves are superimposed on the theoretical curves. P-head wave contours are observed between 3550–3310 m/s. The phase velocity of mode 1 (or the fundamental leaky mode) has an initial value equal to the P-wave velocity of the host medium (about 3550 m/s). Note that the phase velocity of the fundamental (first) mode decreases as a function of increasing frequency toward the P-wave velocity of the waveguide (2627 m/s). The higher order modes 2, 3 and 4 exhibit cutoff frequencies of 520 Hz, 920 Hz, and 1450 Hz, respectively. Seismic responses were selected for a source and detector placed at 0.5 m and 1 m, respectively, below the upper layer interface. The dispersion contours determined by time-frequency analysis agreed with the theoretical group velocity curves shown in FIG. 3. The time-frequency analysis indicates the presence of the first (mode 1) and second leaky (mode 2) modes, as well as the P-head wave. FIG. 3 shows the P-head wave group velocity contour in the range of 3550–3310 m/s. This analysis supports the interpretation that the seismic waves travelling behind the head waves are indeed leaky modes. Dispersion curves of leaky modes, constructed using time-frequency plots of selected traces, can be used to verify that the wavetrains following the P-head waves are indeed leaky modes. In fact, the head wave and the leaky mode form a seismic signature characteristic that can be used to predict the continuity of waveguide targets that do not support normal modes, that is, very low S-wave velocity contrast between the host medium and the waveguide.

To illustrate that head waves and leaky modes can be used to predict the presence of continuous waveguides between wells, we used interwell seismic data from the Gypsy Test Site in Oklahoma, Parra, J. O. et al., "Interwell Seismic Logging For Formation Continuity at the Gypsy Test Site, Oklahoma," Journal of Applied Geophysics, 35, 45–62, 1996. The geology and petrophysical aspects of this sandstone formation have been reported by Doyle, J. D., et al., "Three-Dimensional Distribution of Lithofacies, Bounding Surfaces, Porosity and Permeability in a Fluvial Sandstone, Gypsy Sandstone of Northern Oklahoma," American Association of Petroleum Geologist Bulletin, 79, 70–76, 1995, and the integration of well log and interwell seismic data has been reported by Parra, et al. cited hereinabove.

Figure 4A:
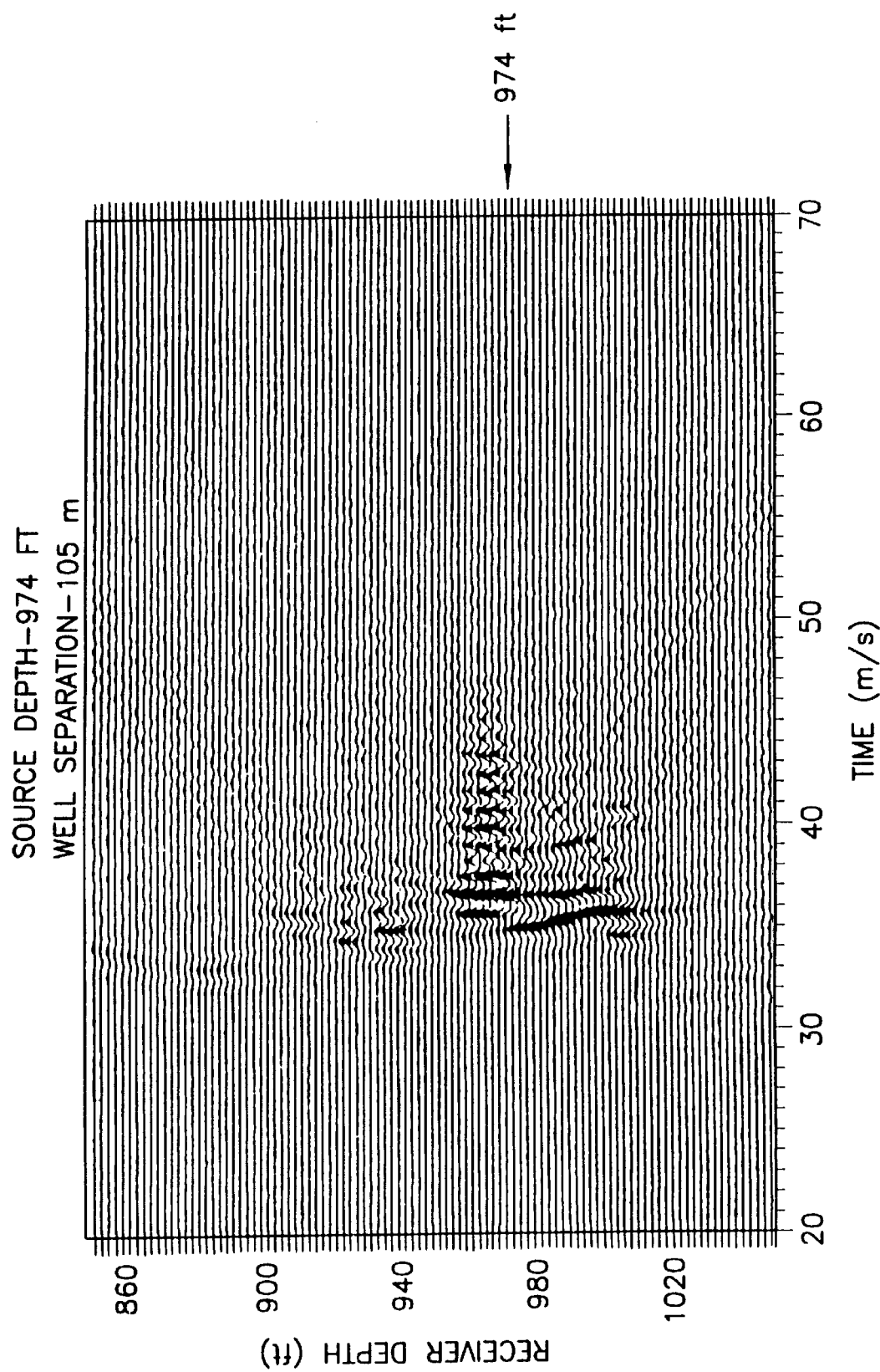
FIGS. 4(a) and 4(b) are diagrams showing the effect of seismic source placement on leaky mode propagation.
Figure 4B:
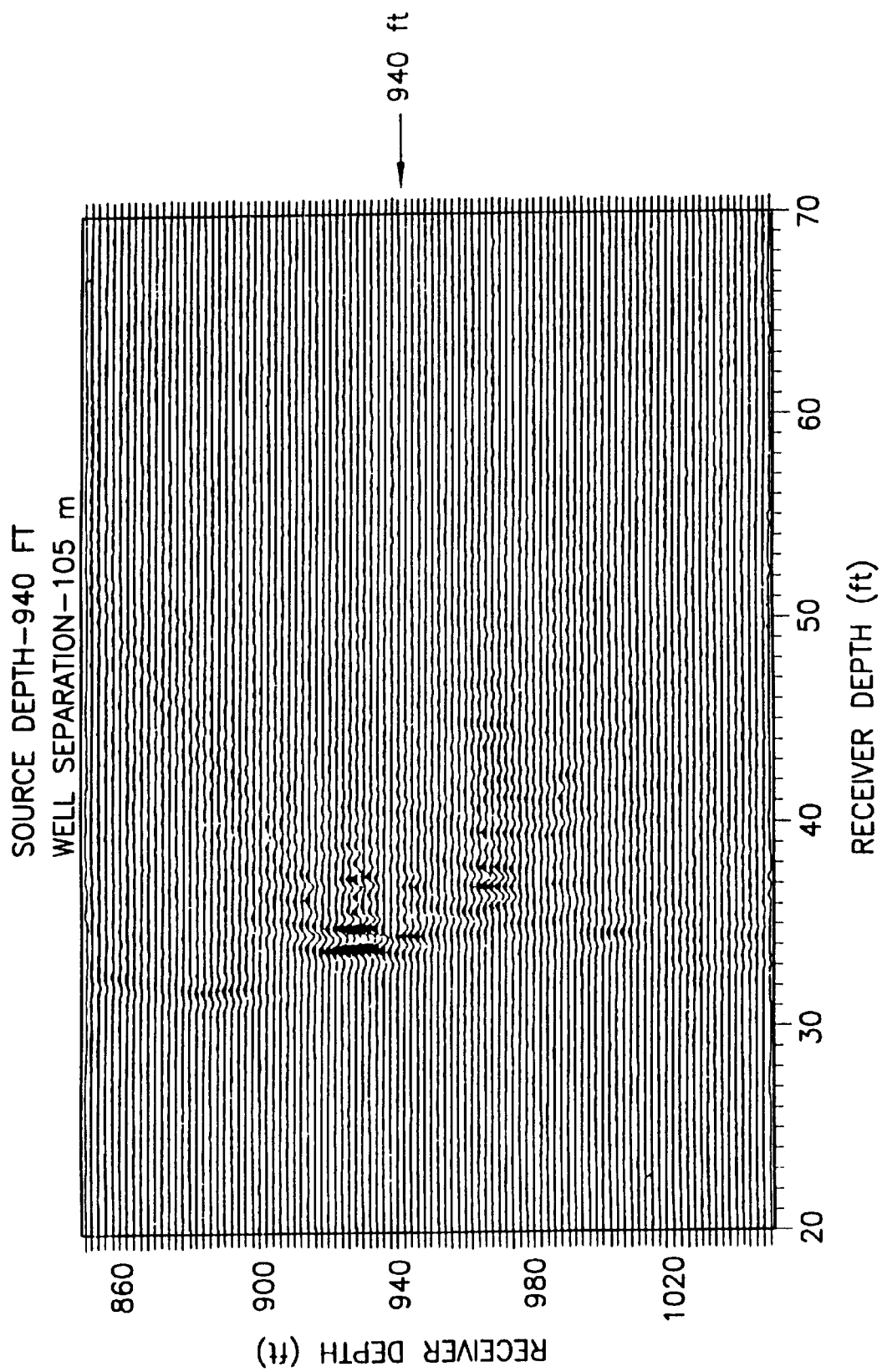

Two common-source seismograms with source depths of 974 feet and 940 feet were selected from crosswell data recorded in a detector well at 105 m from a source well. The common-source seismogram at 974 feet was selected because the source was placed inside a 4-m thick sand waveguide in a fluvial environment previously characterized by Turpening, W. R. et al., "Detection of Reservoir Continuity Using Crosswell Seismic Data-A Gypsy Pilot Study," S.P.E. 24711, 1992 and Parra, et al., cited hereinabove. The waveguide is formed by a low velocity sand surrounded above and below by higher velocities sands (with reduced permeability and porosity). Turpening et al. used a connectivity mapping technique to predict that connectivity, and Parra et al. used time-frequency analysis and numerical modeling integrated with well logs and petrophysics to predict sand continuity. Both interpretations were supported by unpublished pressure-test data collected by British Petroleum which demonstrated that the porous sand is connected between the detector well and the source well. However, in the work by Turpening et al. and Parra et al., the concept of leaky mode regeneration was not addressed because the wavetrains were explicitly observed in the waveguide region containing the source. In this case, the data to characterize the sandstone waveguide was based only on waveforms recorded when the source was placed within the waveguide at 974 feet as shown in FIG. 4(a). To show that the amount of energy trapped in the waveguide will decrease when the source is placed outside the waveguide, we selected the common-source seismogram with the source at 940 feet, 10 m above the sandstone waveguide (FIG. 4(b)). The amplitudes of the waveforms observed at detectors placed within the sandstone waveguide are about 3–4 times smaller when they are compared to those observed in the common-source seismogram in FIG. 4(a). In addition, we observed leaky mode signatures in the common-source seismogram with the source at 940 feet, near the bottom interface of a mudstone waveguide. Here, the leaky modes were excited because the source was within 1 foot of the mudstone waveguide boundary. In fact, leaky modes were not excited in the mudstone waveguide when the source was placed as shown in FIG. 4(a).

As we have seen in the Gypsy Test Site data, leaky modes are easiest to observe in a waveguide when the source is placed within the waveguide or near its interface. In other words, when the source is coupled to the waveguide, the regeneration of leaky modes is more effective than when the source is outside the waveguide. Thus, the amplitude of the leaky modes behind the head waves provides a signature characteristic that can be recognized just by observing common-source seismograms. When the source and detectors are placed within the same low-velocity zone of interest, the leaky modes appear, giving a clear indication of the bed continuity.

Figure 5A:
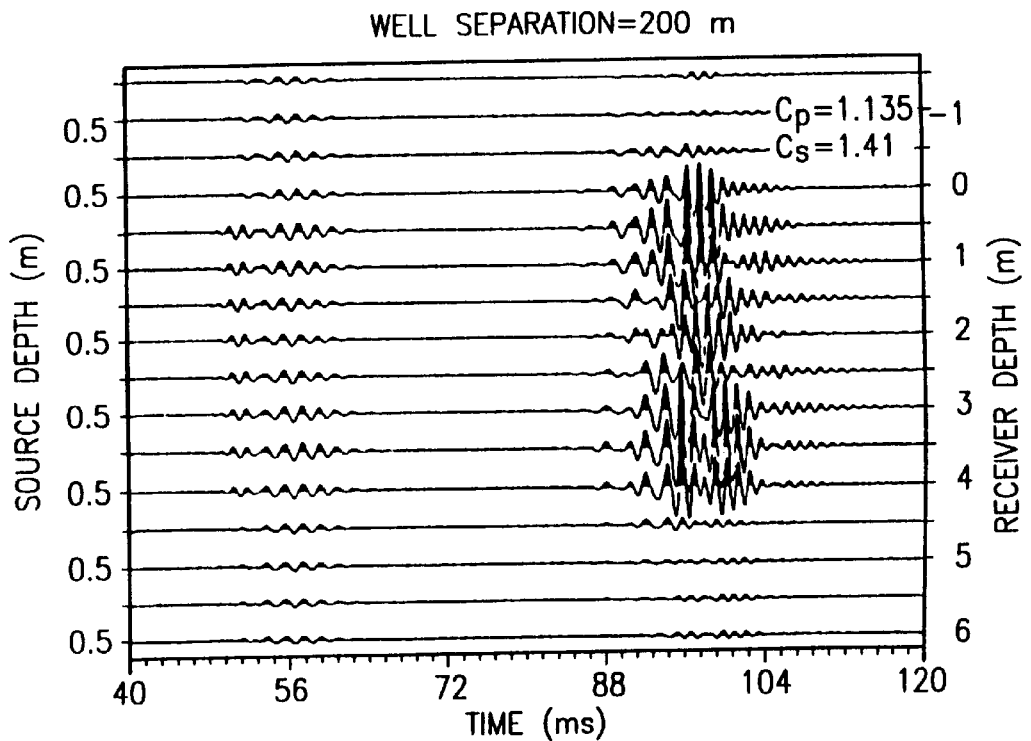
FIGS. 5(a)–5(d) are pressure synthetic seismograms for shale waveguides illustrating the effect of velocity contrast and well separation.
Figure 5B:
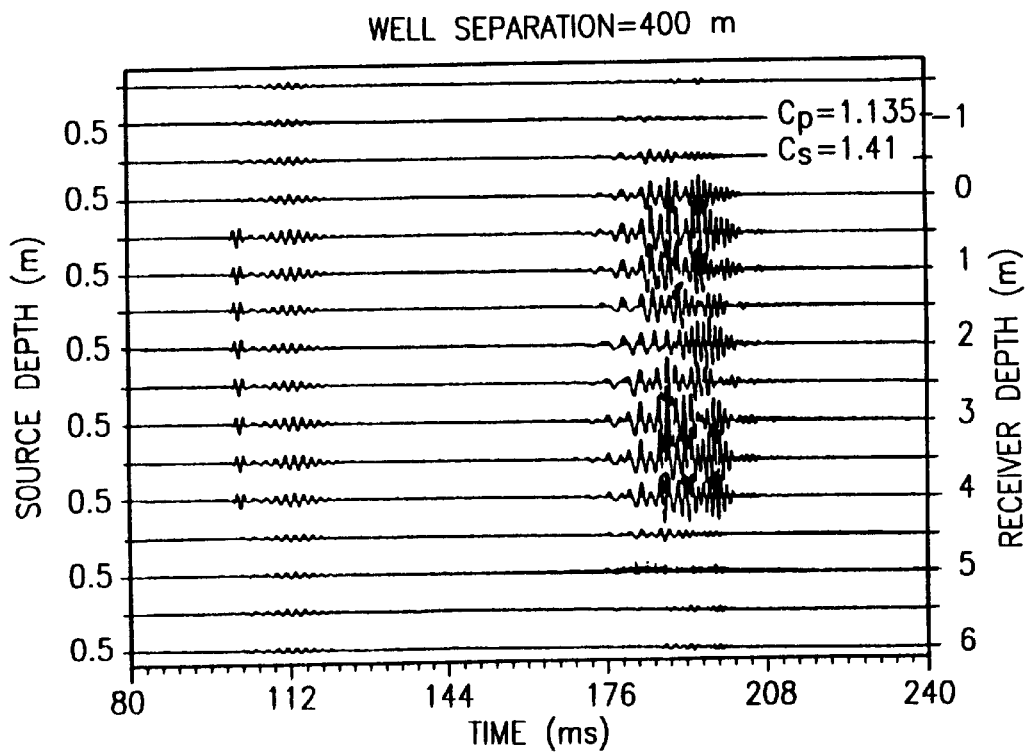
Figure 5C:
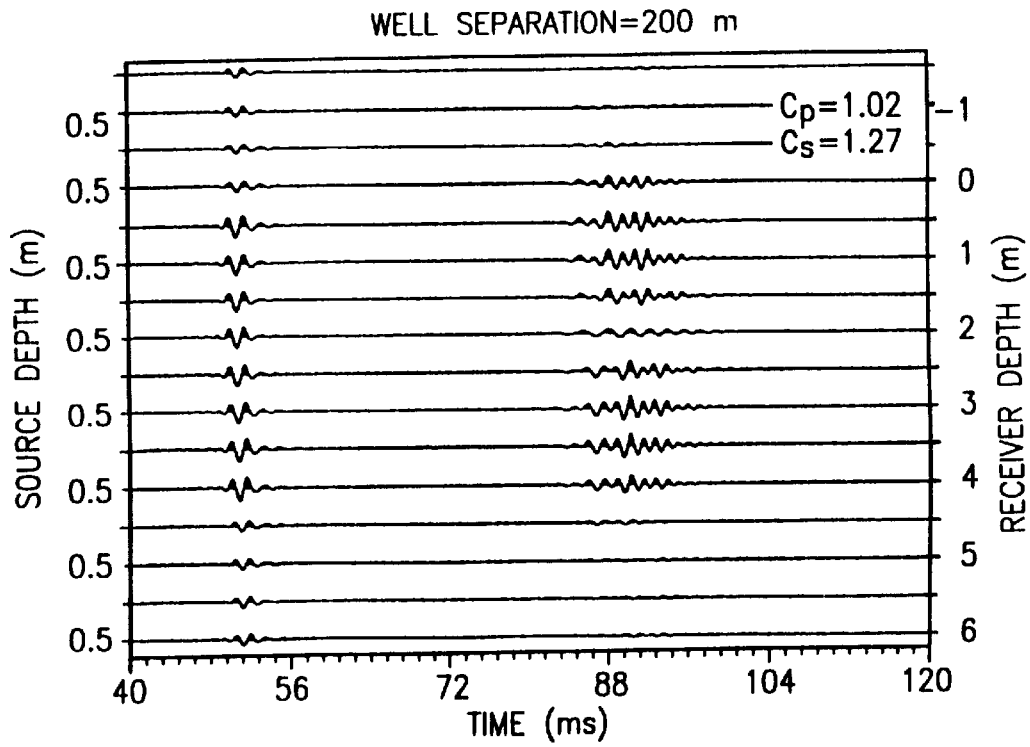
Figure 5D:
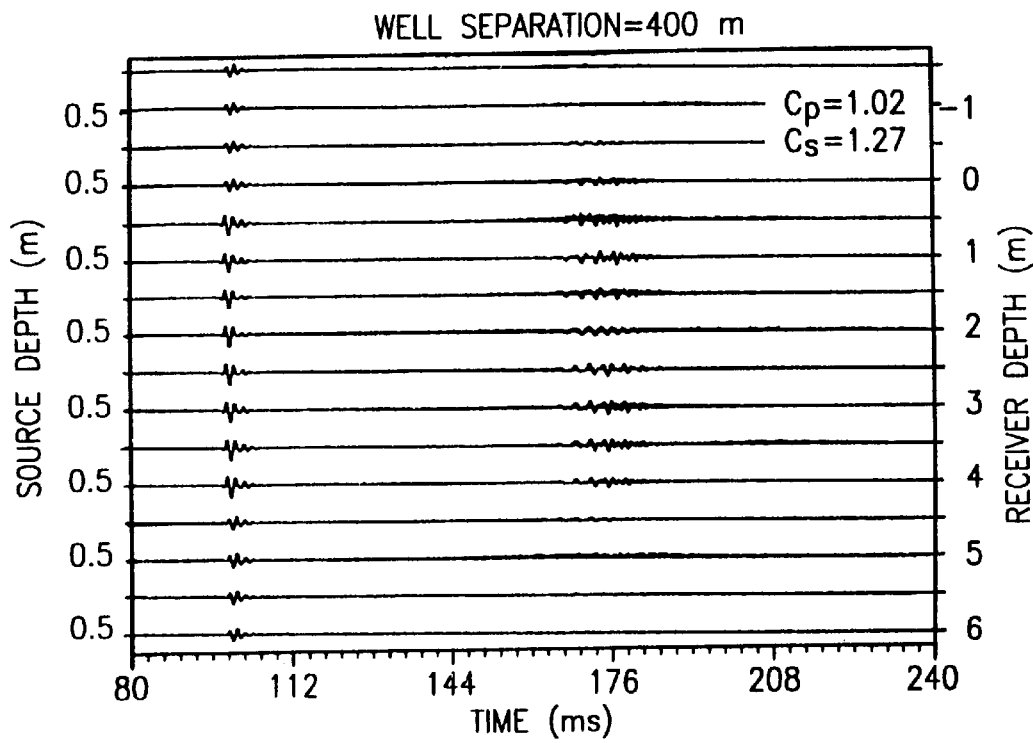

FIGS. 5(a)–5(d) correspond to the signatures associated with a shale waveguide surrounded by a sandstone host medium. To understand these signatures, the velocity ratio between the waveguide target and the host medium is varied. In FIG. 5(a), the pressure synthetic seismogram, for a source detector separation of 200 m, exhibits direct P-wave events which propagate in a waveguide with a P-wave velocity of 3548 m/s. The direct P-wave events arrive at the detectors after 56 ms, and they are followed by reflection events and leaky modes. The full waveforms are dominated by modal wavetrains arriving at 88 ms, which travel with a group velocity of about 2272 m/s, which is less than the shear wave velocity of the sandstone host medium. These wavetrains are normal modes trapped in the shale waveguide. In FIGS. 5(b) and 5(d), the seismic responses show that when the P-wave and S-wave velocity ratios between the shale waveguide and the host medium are decreased, in particular as the P-wave velocity ratio approaches 1, leaky modes are no longer observed. We selected this limiting P-wave velocity ratio to illustrate that normal modes can be observed in a shale waveguide when leaky modes are physically impossible. In this case, the full waveforms are dominated by head waves and normal waves, which exhibit different signature characteristics than those signatures observed for greater shear wave velocity contrasts. The seismic waveforms show that as the P-wave velocity contrast between the waveguide and the host medium is decreased, the presence of leaky modes is reduced in the seismograms. That is, the character of the seismic response reflects the change of the shale waveguide material property at the different detector positions and well separations.

In addition, when the receiver borehole intercepts an inclusion, such as a pinch out or a discontinuity, in addition to the previously described events, a reflection from the end of the inclusion is also recorded. In this case, the difference between the arrival time between the direct event and the reflection event determines the distance between the receiver borehole and the end of the discontinuity. On the other hand, if the receiver borehole does not intercept the inclusion, no energy is trapped in the inclusion and the signature observed at the receiver is similar to that of the host medium, which can be slightly modified by the presence of the inclusion.

Figure 6:
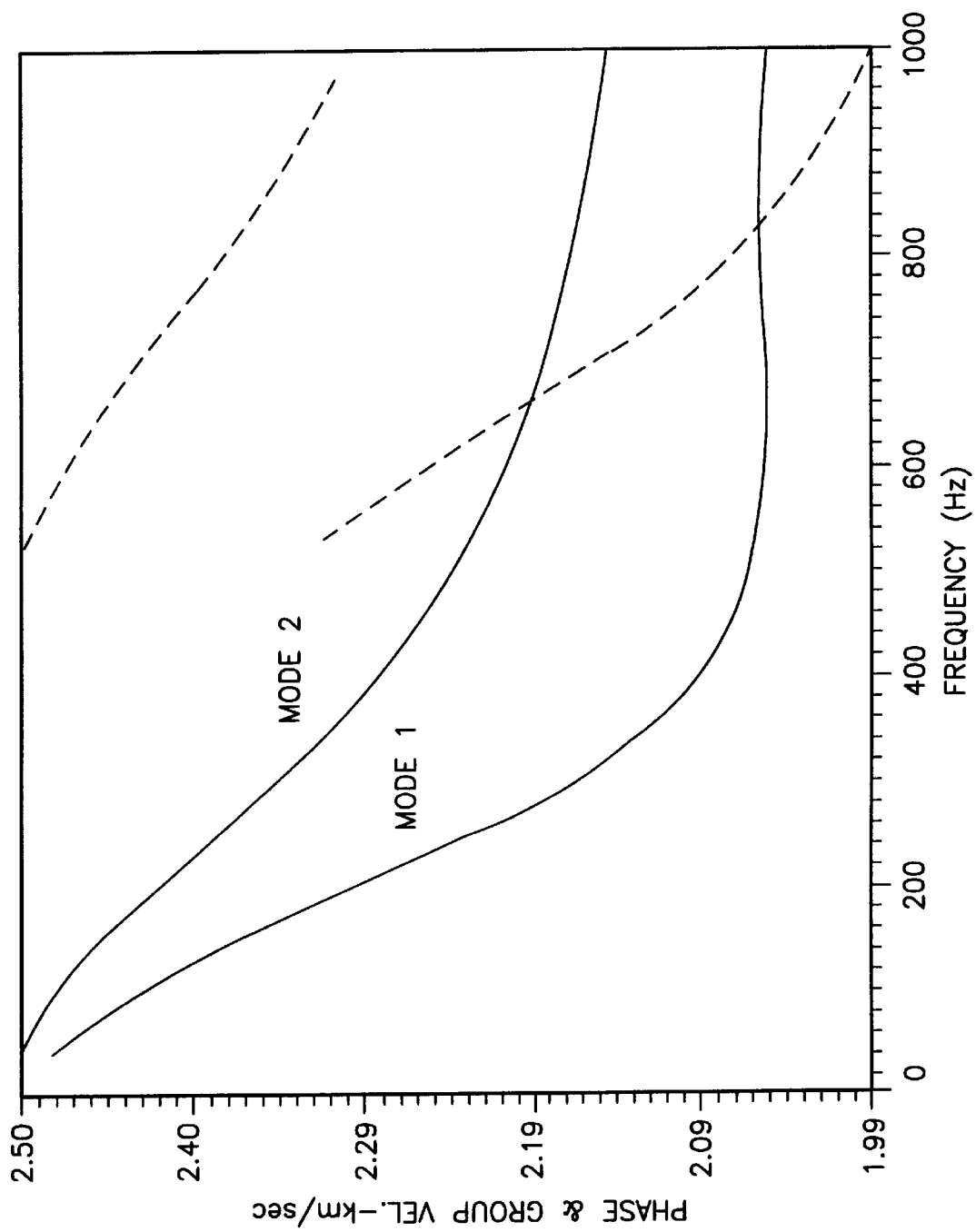
FIG. 6 is a diagram showing phase velocity and group velocity curves for the waveguide geometry shown in FIG. 1.
Figure 7:
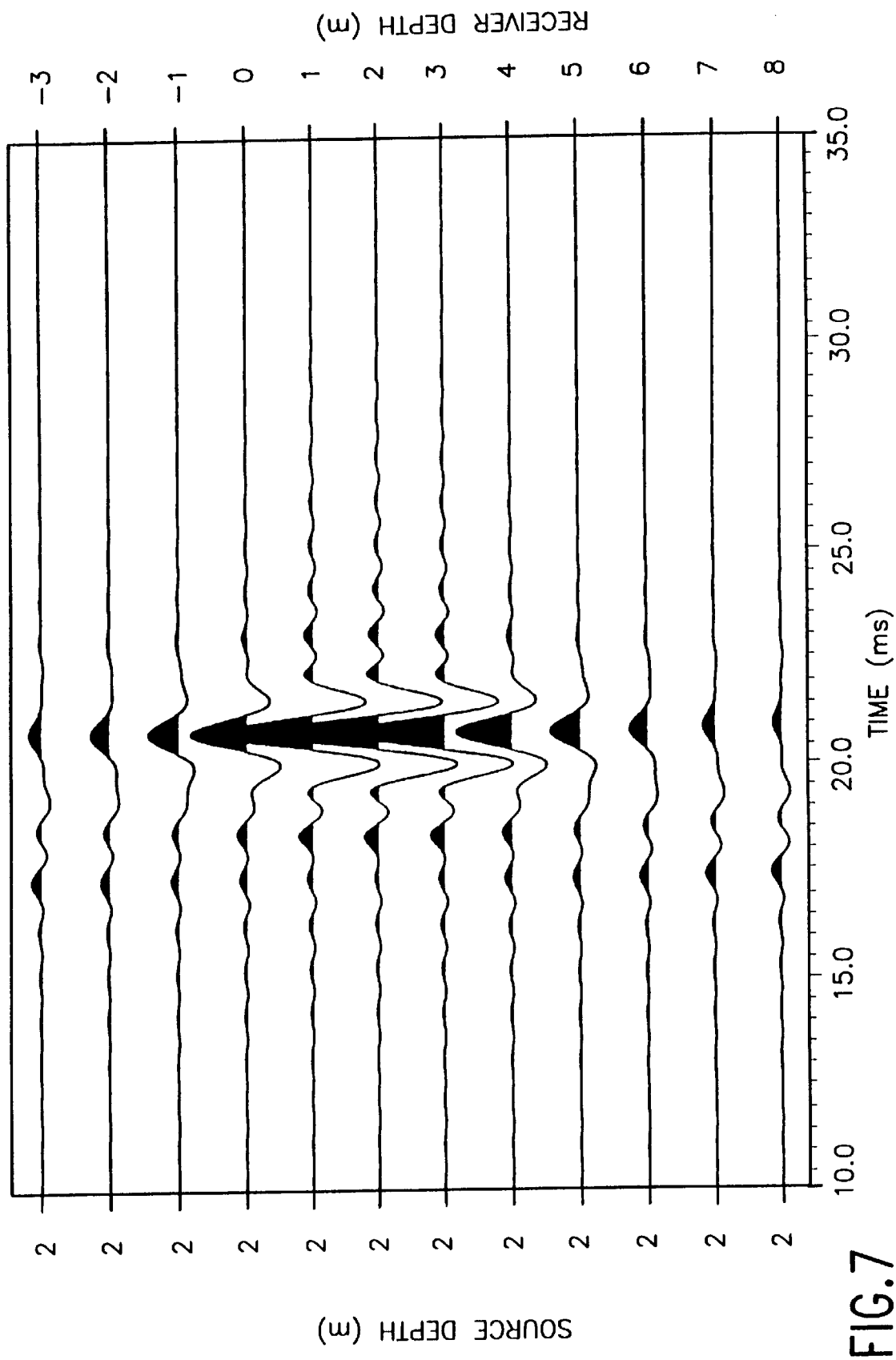
FIG. 7 is a diagram showing the horizontal component synthetic seismogram produced using an SH-wave source placed in the center of the waveguide shown in FIG. 1, the seismogram showing the signature characteristic of a continuous inclusion.
Figure 8A:
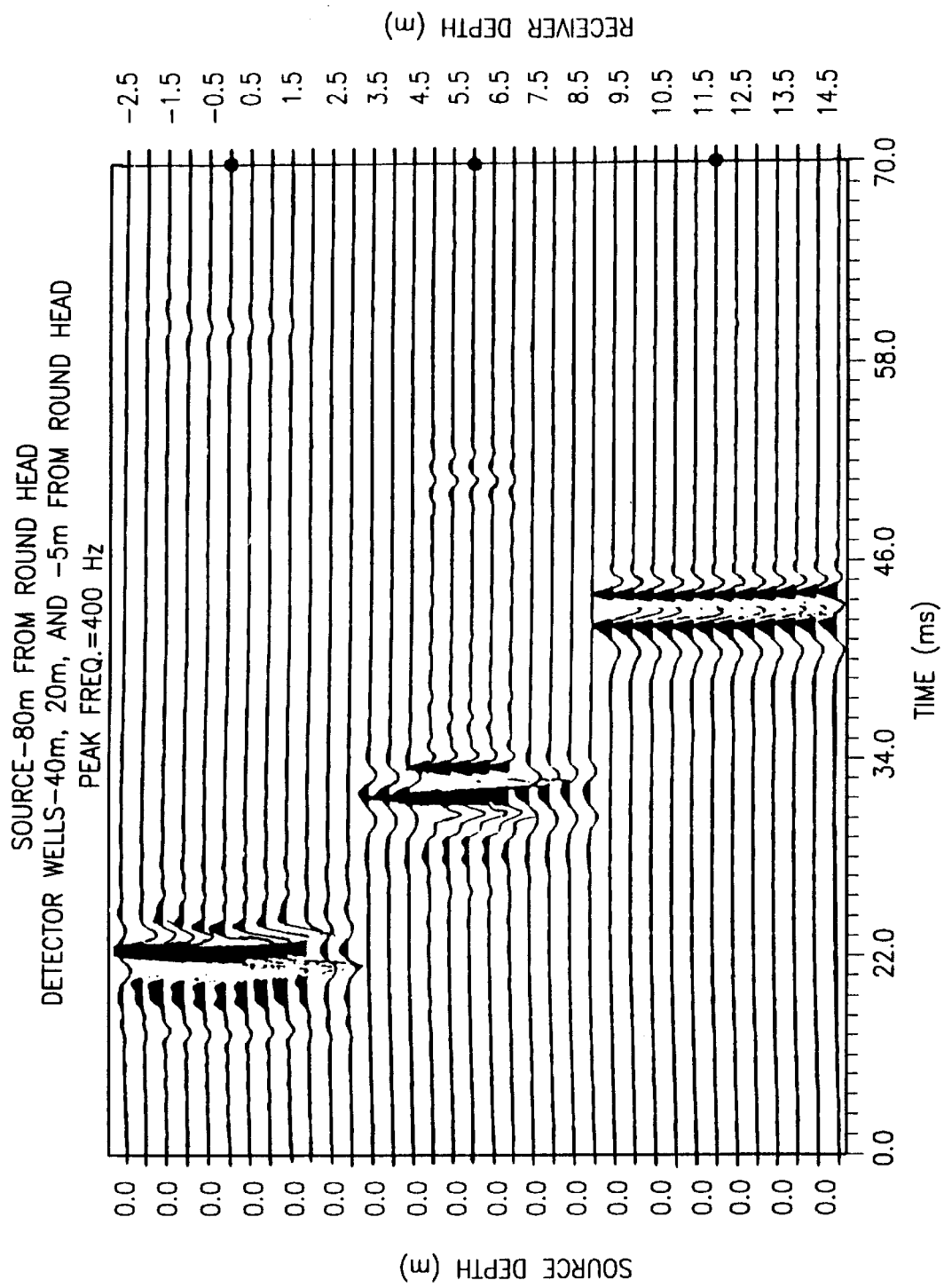
FIG. 8 is a diagram showing seismic responses of a pinch out semi-infinite inclusion for an SH-wave source located at the center of an inclusion and vertical array of detectors intercepting the inclusion at 40 m (meters) and 20 m from the tip of the inclusion as well as the seismic response for an array of detectors located at 10 m outside of the geometry, shown in the last twelve traces.
Figure 8B:
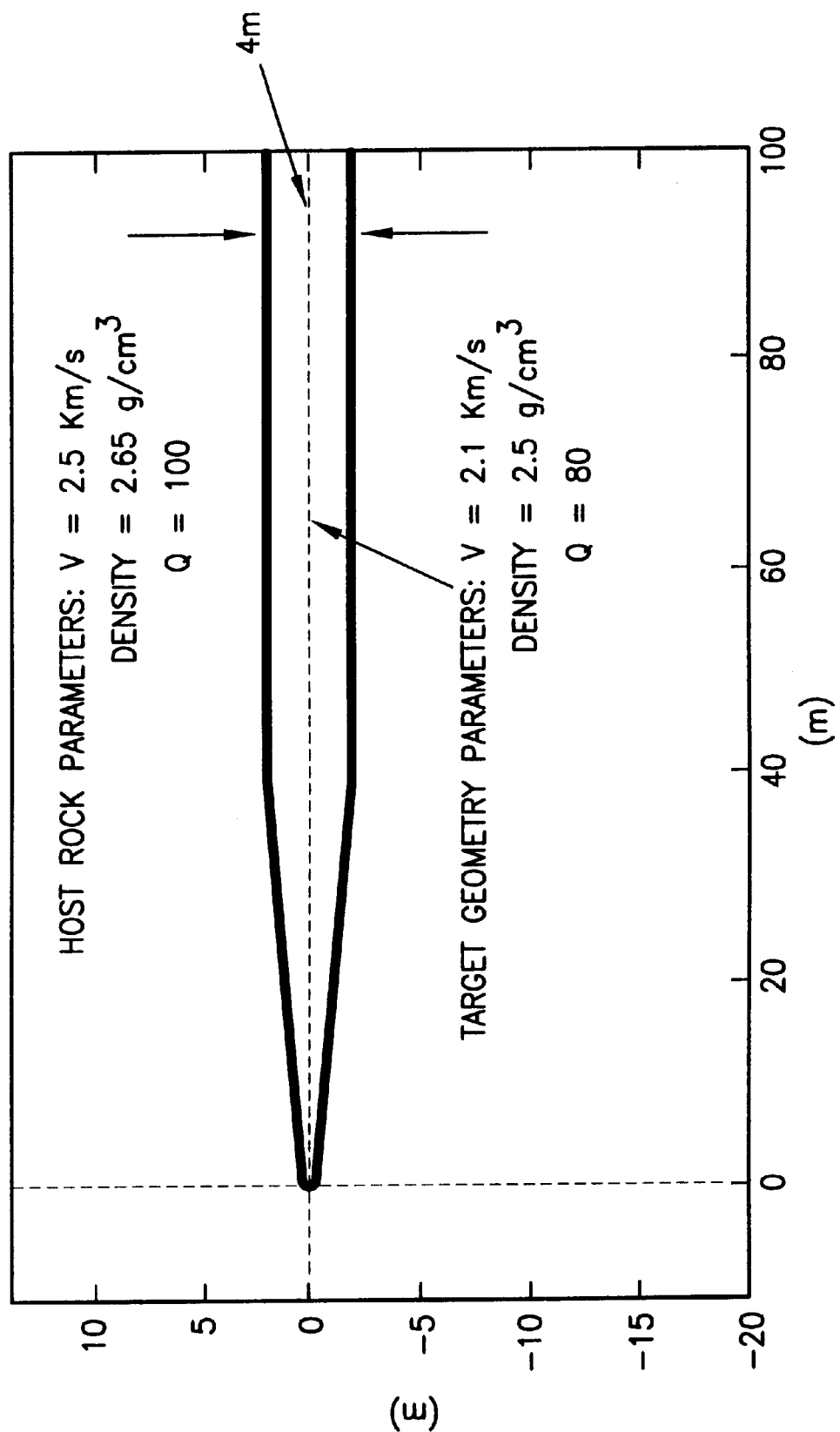
Figure 9A:
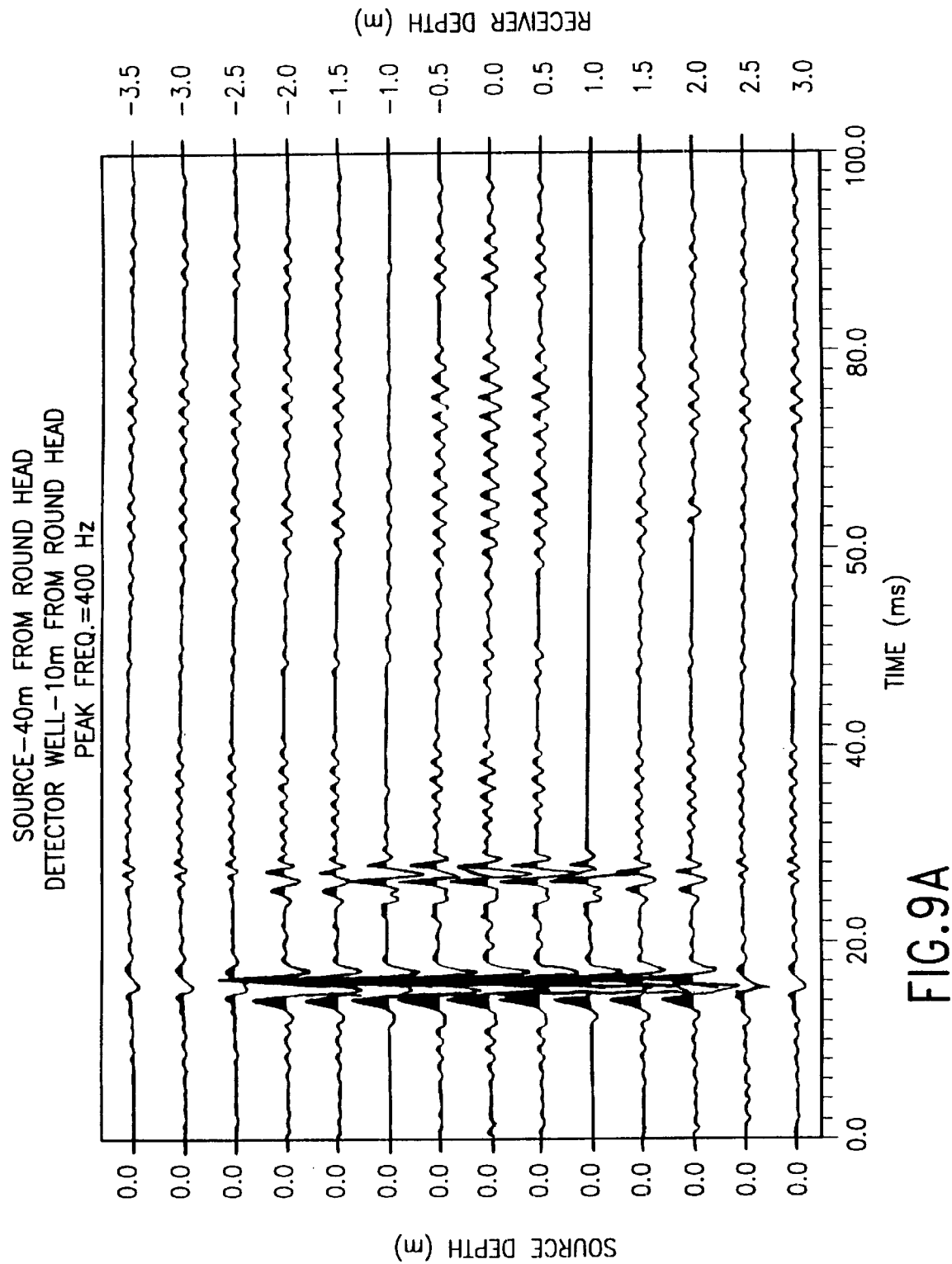
FIG. 9 shows the seismic response of a pinch out semi-infinite inclusion for an SH-wave source located at the center of the inclusion and a vertical array of detectors intercepting the inclusion at 10 m from the round head of the inclusion.
Figure 9B:
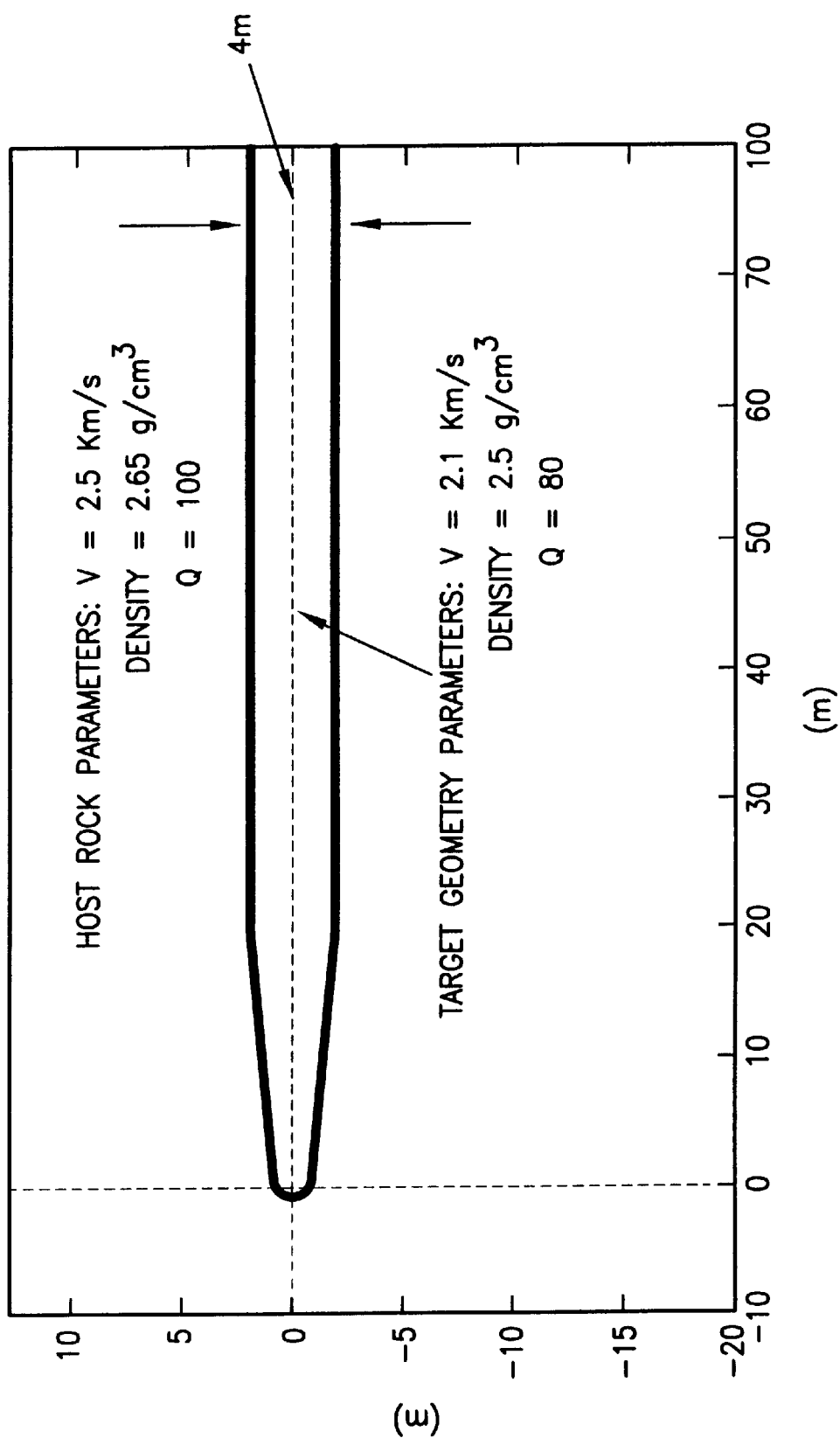

In a similar manner, if an SH-wave source is used, the seismic traces recorded at a receiver borehole intercepting the inclusion comprise head waves, direct SH-waves and pseudo-Love waves. Alternatively, if the receiver borehole does not intercept the inclusion, only the host medium signature is recorded, which can be slightly modified by the presence of the inclusion. For purposes of illustration of this example, phase velocity and group velocity curves for a low-velocity layer having a thickness of 4 m and an SH-wave velocity of 2100 m/s and density of 2.5 gr/cm$^3$ are calculated. The host medium has an SH-wave velocity of 2500 m/s and a density of 2.65 gr/m$^3$. The resulting curves are shown in FIG. 6 and correspond to two guided modes, both group velocity curves starting at the SH velocity of the host medium and decreasing as a function of frequency to reach the velocity of the inclusion. That is, the guided waves excited by the SH-wave source travel with velocities less than the velocity of the host medium and with velocities equal to or greater than the velocity of the inclusion. FIG. 7 shows the horizontal particle velocity component seismogram in this case. The first arrivals are SH head waves, and the next events are guided waves followed by direct SH-waves. Some of these events are trapped in the waveguide and others travel at the interfaces of the inclusion. The head wave, guided wave, and the direct events form a seismic signature that is typical of a continuous inclusion between two boreholes. Indeed, as shown in FIG. 8, this signature can be observed when both boreholes intercept a pinch out inclusion. The first two signatures, having twelve traces each, are intercepted by receiver boreholes located at 40 m and 20 m, respectively, from the discontinuity. The third signature of twelve traces corresponds to that of the host medium. In this case, the receiver borehole is not intercepting the inclusion. In addition, the first two signatures exhibit reflection events associated with the presence of the discontinuity. When the receiver borehole does not intercept the inclusion, the seismic signature does not contain such a reflection event as is observed in the last twelve traces. In addition, the magnitude of the amplitude of the reflection part of the waveform indicates the thickness of the end part of the discontinuity. This concept is observed by comparing FIGS. 8 and 9. FIG. 8 is for a pinch out geometry having the smallest thickness equal to one-half meter, and FIG. 9 is for a pinch out, or round head, having the smallest thickness equal to 2 m. As can be seen, the magnitude of the reflection shown in FIG. 9 is much greater than the magnitude of that shown in FIG. 8.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A method for detecting a presence of at least one of a continuous waveguide and a discontinuous waveguide in a subterranean geological formation comprising the steps of:

determining at least one seismic signal characteristic of a waveguide target corresponding to a seismic wave receiver borehole;

generating a seismic wave signal in a source borehole disposed at a distance from said seismic wave receiver borehole;

detecting said seismic wave signal at said seismic wave receiver borehole; and analyzing said detected seismic wave signal for a presence of said at least one seismic signal characteristic, whereby the presence of said at least one seismic signal characteristic is indicative of a continuous waveguide disposed between said source borehole and said seismic wave receiver borehole.

2. A method in accordance with claim 1, wherein said seismic waves are detected by one of a hydrophone array and a three component detector array.

3. A method in accordance with claim 1, wherein said seismic source generates P-waves and S-waves.

4. A method in accordance with claim 1, wherein said one of said continuity and said discontinuity is determined by analyzing seismic traces comprising head waves, direct waves and leaky modes where said waveguide has a P-wave velocity greater than an S-wave of a host medium and very low shear wave velocity contrast between the waveguide and the host medium.

5. A method in accordance with claim 1, wherein said one of said continuity and said discontinuity is determined by analyzing seismic traces comprising head waves, direct waves, and normal modes where said waveguide has a P-wave velocity less than an S-wave of a host medium and a very low P-wave velocity contrast between the waveguide and the host medium.

* * * * *